US006646360B2

(12) United States Patent
Brown

(10) Patent No.: US 6,646,360 B2
(45) Date of Patent: Nov. 11, 2003

(54) SYSTEM, METHOD AND APPARATUS FOR CONNECTING ELECTRICAL SOURCES IN SERIES UNDER FULL LOAD

(75) Inventor: Gerald M. Brown, Alpharetta, GA (US)

(73) Assignee: Siemens Energy & Automation, Alpharetta, GA (US)

( * ) Notice: Subject to any disclaimer, the term of this patent is extended or adjusted under 35 U.S.C. 154(b) by 0 days.

(21) Appl. No.: 10/210,276

(22) Filed: Aug. 1, 2002

(65) Prior Publication Data
US 2003/0025399 A1 Feb. 6, 2003

Related U.S. Application Data

(63) Continuation of application No. 09/467,428, filed on Dec. 20, 1999, now abandoned.

(51) Int. Cl.[7] ................................................ B60L 11/06
(52) U.S. Cl. .......................... 307/43; 307/9.1; 307/71; 191/4
(58) Field of Search ................................ 307/9.1, 10.1, 307/44, 50, 69, 70, 71, 76, 77, 78, 43; 191/2, 3, 4; 180/65.1, 65.3, 65.4

(56) References Cited

U.S. PATENT DOCUMENTS

| 3,249,836 A | * | 5/1966 | Stamm ........................ 318/17 |
| 4,009,431 A | * | 2/1977 | Johnson ....................... 322/7 |
| 4,328,427 A | * | 5/1982 | Bond ........................... 290/3 |
| 4,339,704 A | * | 7/1982 | McSparran et al. ........... 322/90 |
| 4,483,148 A | * | 11/1984 | Minami ....................... 60/698 |
| 4,719,361 A | * | 1/1988 | Brubaker ..................... 290/45 |
| 4,853,553 A | * | 8/1989 | Hosie ....................... 290/40 C |
| 5,103,923 A | * | 4/1992 | Johnston et al. ........... 180/65.2 |
| 5,351,775 A | * | 10/1994 | Johnston et al. ........... 180/65.2 |
| 5,389,825 A | * | 2/1995 | Ishikawa et al. ........... 307/10.1 |
| 5,734,205 A | * | 3/1998 | Okamura et al. ........... 307/110 |

FOREIGN PATENT DOCUMENTS

| WO | WO 82/00225 | * | 1/1982 | ............ H02P/9/00 |
| WO | WO 93/04887 | * | 3/1993 | ............ B60L/9/08 |

* cited by examiner

Primary Examiner—Gregory J. Toatley, Jr.
Assistant Examiner—Roberto J. Rios

(57) ABSTRACT

A circuit connects a low-voltage high-current DC power source ($P_L$) in series with a high-voltage low-current DC source ($P_D$). The series connection is made under full power by using the second source $P_L$ to commutate the load current and allow the first source $P_D$ to be reconfigured from series to parallel operation, doubling its current rating.

20 Claims, 8 Drawing Sheets

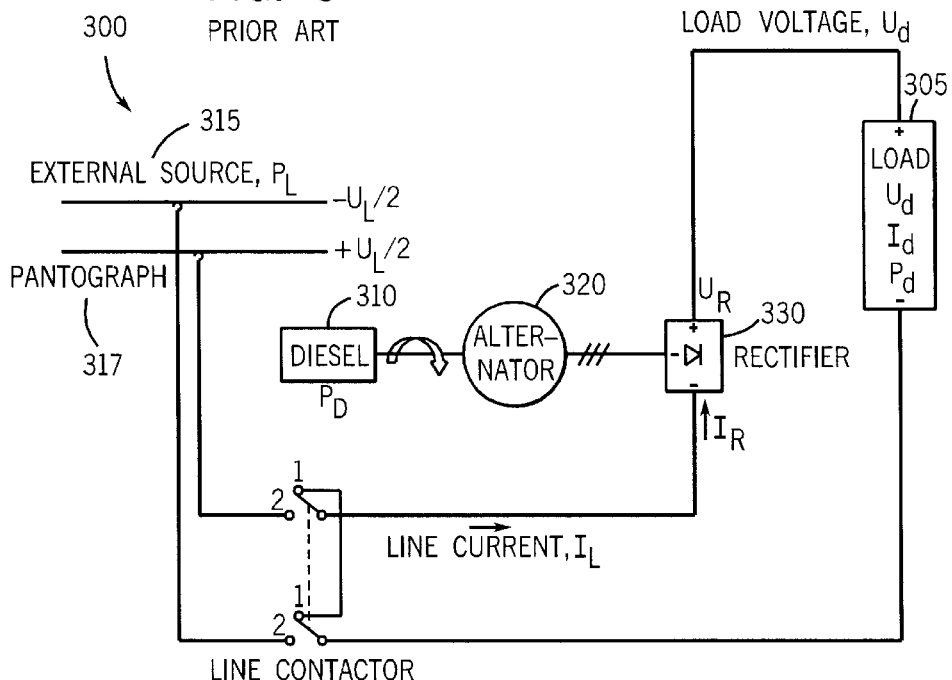
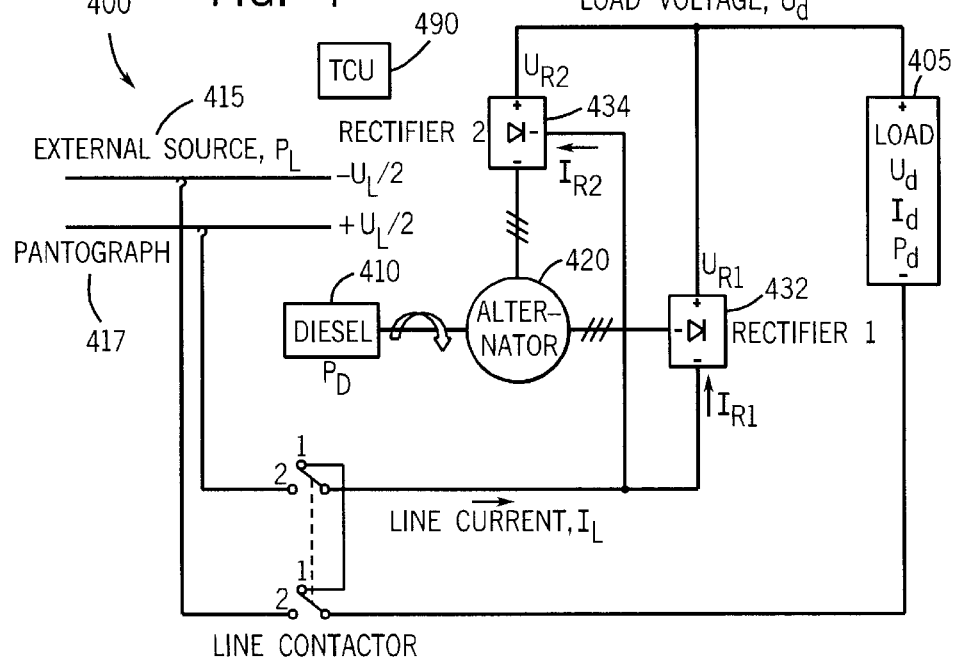

| PARAMETER | OPERATING MODE | DIESEL ONLY | DIESEL BOOST TROLLEY | DIRECT TROLLEY | NOTATION: |
|---|---|---|---|---|---|
| LOAD VOLTAGE, $U_d$<br>LOAD CURRENT, $I_d$<br>LOAD POWER, $P_d$ | | $U_d = U_{R1} + U_{R2}$<br>$I_d = I_{R1} = I_{R2}$<br>$P_d = P_D = P_1 + P_2 < P_{d,max}$ | $U_d = U_L + U_{R1} = U_L + U_{R2}$<br>$I_d = I_L = I_{R1} + I_{R2}$<br>$P_d = U_d \cdot I_L = P_D + P_L$<br>$= P_1 + P_2 = P_{d,max}$ | $U_d = U_L$<br>$I_d = I_L, I_{R1} = I_{R2} = 0$<br>$P_d = U_L \cdot I_L = P_L$<br>$= P_1 + P_2 = P_{d,max}$ | U=VOLTAGE<br>I=CURRENT<br>P=POWER<br><br>L=LINE<br>R=RECTIFIER<br>d=DC VALUE<br>D=DIESEL<br>max=MAXIMUM<br>1=MOTOR 1<br>2=MOTOR 2 |
| SWITCH CONFIGURATION | | $S_1, S_2,$ AND $S_3$ IN POSITION 1<br>(RECTIFIERS IN SERIES)<br>$S_4$ IN POSITION 1 | $S_1, S_2,$ AND $S_3$ IN POSITION 2<br>(RECTIFIERS IN PARALLEL)<br>$S_4$ IN POSITION 1 | $S_1, S_2,$ AND $S_3$ IN POSITION 1<br>(RECTIFIERS INACTIVE)<br>$S_4$ IN POSITION 2 | •LOSSES NEGLECTED |

OPERATING CONDITIONS*

FIG. 11

SYSTEM, METHOD AND APPARATUS FOR CONNECTING ELECTRICAL SOURCES IN SERIES UNDER FULL LOAD

CROSS REFERENCE TO RELATED APPLICATIONS

This is a Continuation Application of application Ser. No. 09/467,428, filed Dec. 20, 1999 now abandoned, which is hereby incorporated by reference.

The present application claims priority under 35 U.S.C. §119(e) to U.S. Provisional Patent Application Ser. No. 60/113,046 entitled CIRCUIT TO CONNECT TO ELECTRICAL SOURCES IN SERIES WHILE UNDER FULL LOAD filed on Dec. 21, 1998, and incorporated herein by reference in its entirety.

FIELD OF THE INVENTION

The present invention is related to a system, method and apparatus for connecting a low-voltage high-current DC source ($P_L$) in series with a high voltage low-current DC source ($P_D$) when additional power is required by the load to operate at maximum power ($P_{d,max}$). The invention enables the series connection to be made under full power by using the second source $P_L$ to commutate the load current and allow the first source $P_D$ to be reconfigured from series to parallel operation, doubling the current rating of the first source $P_D$.

In a preferred embodiment, the invention doubles the current rating of the low-current high-voltage source $P_D$ by separating it into two series sources and reconfiguring the sources to operate in parallel. The output voltage of $P_D$ in parallel mode is only half its series value but this is compensated for by the addition of the series connected high-current low-voltage source $P_L$. One feature of this invention is that it enables the second source $P_L$ to be connected in series with the first source $P_D$ seamlessly while under full power and without appreciably dropping the flow of power to the load or raising the voltage of the load. Further, this transition to a series connection can be done while operating within the rating constraints of the first and second sources $P_D$, $P_L$ such that the power transfer is transparent to the load. As such, no anomalies in power (current or voltage interruptions, spikes, oscillations, drop-off, perturbations, etc.) are sensed by the load. Anomalies are avoided by using the second source $P_L$ to naturally commutate the load current. The resulting circuit topology allows the load current to be increased to its limit with both sources contributing power at their rated limits and the load power to be increased to its maximum, $P_{d,max}$, where $P_{d,max} = P_D + P_L$. A further feature of this invention is the control strategy used to control the source $P_D$ and effect the transitions between modes by means of switches ($S_1$, $S_2$, $S_3$) connected to the outputs of rectifiers 1 and 2.

BACKGROUND OF THE INVENTION

A Problem Solved by this Invention

FIG. 1 illustrates a conventional diesel operation system 100. In system 100, an electrical load 105 is supplied by a diesel engine 110 driving a three phase, single-winding alternator 120 connected to a diode rectifier 130. The alternator/rectifier combination 120 and 130 is constrained by current and voltage ratings based on the rated engine power at full rpm. In this case, the load is generally operated at constant DC voltage with power varying in proportion to the DC input current. In some cases, the DC voltage may be reduced when the load requires lower voltage. In addition, the alternator may consist of two windings with two rectifiers and means to effect series or parallel connections of these rectifiers in a manner known to a person familiar with the technology, allowing the alternator and rectifier to be smaller for a given load. This technique is not suitable for the problem at hand.

It is desirable to operate the load at higher power by connecting a second high-current power source in series with the output of the rectifier. The second source, which is constrained at about half the rated load voltage, must be connected in series while the load is operating at full diesel power and, furthermore, must not appreciably raise the load voltage.

The problem, therefore, is to find an economically viable circuit topology and control strategy to connect a low-voltage high-current power source $P_L$ in series with a high-voltage low-current power source $P_D$ that is operating an electrical load or loads. The circuit must double the current rating of $P_D$, not increase the load voltage, and allow for smooth connection of the second source $P_L$ at times when increased load current is required for higher power operation.

Prior Approaches to Supply More Current to the Load at Rated Voltage

FIG. 2 illustrates a conventional parallel line connection system 200. In system 200, a diesel engine 210 drives an alternator 220 connected to a diode rectifier 230. Additional current is available to operate a load 205 at higher power if an external DC source 215 is connected in parallel with the output of the rectifier 230. When the voltage of external source 215 is greater than the output of rectifier 230, the rectifier diodes become reverse biased, the load current transfers from alternator 220 to external source 215 and, as a result, the alternator/rectifier current decreases to zero. This type of parallel line connection allows an external source to supply the additional current and power at the rated voltage of the load. The connection can be made while the load is operating at full diesel power but the voltage of the external source must equal the required voltage of the load. Details of effecting smooth connect and disconnect transitions are familiar to those with knowledge of the art.

FIG. 3 illustrates a conventional series line connection system 300. In system 300, a diesel engine 310 drives an alternator 320 connected to a diode rectifier 330. If the voltage of an external source 315 is lower than the rated load voltage, source 315 can be connected in series with rectifier 330 to provide additional power while maintaining the required load voltage. In this type of series line connection, alternator 320 is operated at a reduced voltage so that the resulting load voltage remains at its rated valued. Rectifier 330 and external source 315 each carry the full load current but they contribute power proportional to their respective voltages. This mode is also referred to herein as Diesel Boost Operation since the voltage of external power source 315 is boosted by the diesel/alternator/rectifier combination to supply the load at its rated voltage and with higher power.

Disadvantages of These Approaches

The use of a parallel line connection as in system 200 described with reference to FIG. 2 is limited to cases where the voltage of the external source is within the allowable operating voltage of the load.

The use of a series line connection as in system 300 described with reference to FIG. 3 has two serious problems.

The first is that the alternator and rectifier must be oversized to handle the increased load current even though they operate at less than rated voltage while in series mode. For example, if the load power is doubled during Diesel Boost Operation and the external source supplies half the load voltage, then the alternator and rectifier must carry twice their rated current at half their rated voltage. While the alternator's output power remains essentially the same as in system 100 described with reference to FIG. 1, the losses due to the high currents are prohibitive and this mode of operation is only possible for a very short time. It may be noted that prior systems typically use two windings and two rectifiers with series and parallel operating modes to avoid oversizing the components. But prior systems do not seek to provide more power by means of one (or more) additional sources connected in series.

The second problem is that there is considerable difficulty in switching from Diesel Operation (system 100) to Series Line Operation (system 300) without shutting off or disrupting uniform power to the load. The required load transfer must be rapid and not cause any abrupt change in load current or voltage. This requires the complicated steps of transferring the load current over a temporary commutation path, interrupting the rectifier (and alternator) output current, reducing the rectifier (and alternator) output voltage, connecting the external voltage source in series with the rectifier output, and then increasing the current to its former level to complete the commutation process. Only after this transition is complete can the current be increased to provide the desired higher load power. There is no economical method to known in prior systems to accomplish the required commutation process with a simple series line connection.

An approach to supply more current to the load may be to reconfigure the alternator windings into two parallel sets of windings (forming a dual winding alternator) and connecting the windings to two rectifiers as in prior systems. However, there are no known means heretofore to simultaneously maintain the load at its rated voltage (without drop off, perturbations, etc.) while connecting the two parallel connected rectifiers in series with the external source.

In summary, a parallel line connection such as system 200 described with reference to FIG. 2 will not work when the voltage of the available external source is less than the minimum rated voltage of the load. A series line connection such as system 300 described with reference to FIG. 3 is not practical because the size of the alternator and rectifier have to be increased to handle the higher currents and there is no feasible way to make the series connection with the external source while under power. A dual winding alternator with two parallel connected rectifiers will not work because the output voltage is too low for the load when the series connection is not present and there is no means to seamlessly effect the series connection to the external source.

Heretofore, there has been no means for resolving the foregoing problems.

SUMMARY OF THE INVENTION

The present invention relates to a system that overcomes the drawbacks mentioned above by providing a low-voltage/high-current source $P_L$ to supply additional power to a high voltage load without appreciably dropping the flow of power to the load or raising the voltage of the load while operating within the rating constraints of the first and second sources $P_D$, $P_L$ such that the power transfer is seamless, i.e., transparent to the load. As such, no anomalies in power (current or voltage interruptions, spikes, oscillations, drop-off, perturbations, etc.) are sensed by the load.

In an exemplary embodiment, the invention doubles the current rating of a high-voltage low-current source $P_D$, allowing it to operate indefinitely (i.e., extended periods of time) at increased currents required by a series connection with a low-voltage high-current source $P_L$ in order to operate a load at a higher power level.

The present invention further provides the second source $P_L$ to be seamlessly connected (and seamlessly disconnected) in series with the first source $P_D$ while the load is operating under full power.

The resulting circuit topology and control strategy overcomes the disadvantages of both the parallel and series line connections that previously rendered them unsuitable for this application. This invention can make it possible to connect a high-current source in series with an operating low-current source and increase the load current to its limit.

BRIEF DESCRIPTION OF EXEMPLARY EMBODIMENTS

Exemplary embodiments of the invention will hereafter be described with reference to the accompanying drawings, wherein like numerals denote like elements, and:

FIG. 3 is a schematic circuit diagram illustrating a simple series line connection in accordance with a conventional system;

FIG. 4 is a schematic circuit diagram of a series line connection with parallel rectifiers;

FIG. 11 is a table of operating conditions in diesel, diesel boost, and diesel trolley modes in accordance with an exemplary embodiment.

DETAILED DESCRIPTION OF EXEMPLARY EMBODIMENTS

Figure 1:
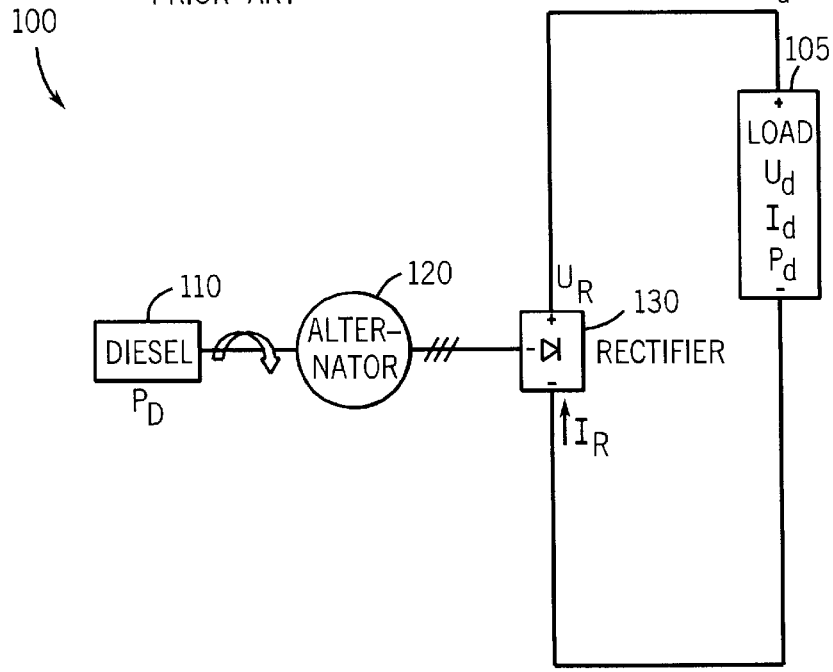
FIG. 1 is a schematic circuit diagram illustrating a diesel operation in accordance with a conventional system having internal series and parallel configurations omitted for clarity.

Exemplary embodiments are preferably described by considering the solution in two parts. However, it will be appreciated that the form of explanation shall not limit the scope of the invention as claimed and that the invention may be described or practiced otherwise.

Part 1—Use of a Dual Winding Alternator and Two Rectifiers to Double the Current Rating FIG. 4 illustrates a dual winding alternator and two rectifier system 400 that resolves the problem of high alternator/rectifier currents during series operation. In this instance, an alternator 420 is configured with two star windings and the resulting six outputs are connected to two separate diode rectifiers 432 and 434. In an exemplary embodiment, each winding has the same rated current and one-half the rated voltage as a single winding alternator. Of course, other configurations are possible. For example, it is possible to configure three star windings with nine outputs connected to three separate rectifiers.

The outputs of rectifiers 432 and 434 can be connected in series to supply the rated current and voltage to a load 405. The addition of the second rectifier slightly reduces the overall system efficiency, but this is acceptable for the particular application of the present invention. One advantage is that with the use of each additional rectifier the voltage rating of each rectifier may be reduced because the series connection reduces the blocking voltage requirement on each rectifier.

This series configuration is suitable for normal diesel operation when the load power can be met by the diesel engine and the full load voltage must be supplied by the alternator/rectifier combination. In this mode, the alternator windings and rectifier are at the same current levels that they would be for a single winding/single rectifier solution. Advantageously, the voltage and flux levels in the alternator are unchanged.

The outputs of rectifiers 432 and 434 can be connected in parallel to supply, in an exemplary embodiment, twice the rated current at half the rated voltage. This configuration is suitable for a diesel boost operation when the alternator and rectifier must handle much higher currents at a greatly reduced voltage. Here again, the alternator windings and rectifiers operate at the same current level as for the single winding case, but in this case, the parallel configuration doubles the output current.

The use of a dual winding alternator 420 with two rectifiers 432 and 434 that can be connected in either series or parallel solves the problem of excessively high alternator and rectifier currents. The series connection provides rated voltage under diesel operation and the parallel connection doubles the output current capability. Hence, system 400 resolves the previous voltage and current problems without appreciably dropping the flow of power to the load or raising the voltage of the load while operating within the rating constraints of the first and second sources $P_D$, $P_L$. The means of effecting the transition from diesel operation with series connected rectifiers 432 and 434 to diesel boost operation with parallel connected rectifiers 432 and 434 connected in series with external source 415 is described in part 2 below.

The use of a dual winding alternator 420 with two rectifiers 432 and 434 that can be configured in either series or parallel may be applied to various applications. Although the exemplary embodiments are explained below with reference to a diesel engine powered electric drive vehicle connected to a trolley, the invention may be applied, for example, to locomotives where the available power is limited, high current is required at low voltage, and low current is required at high voltage, corresponding to low speed and high speed operation, respectively. One distinguishing feature is that dual winding alternator 420 with two rectifiers 432 and 434 is used to facilitate smooth series-to-parallel and parallel-to-series transitions particularly while under full load and while maintaining full load voltage.

Figure 10:
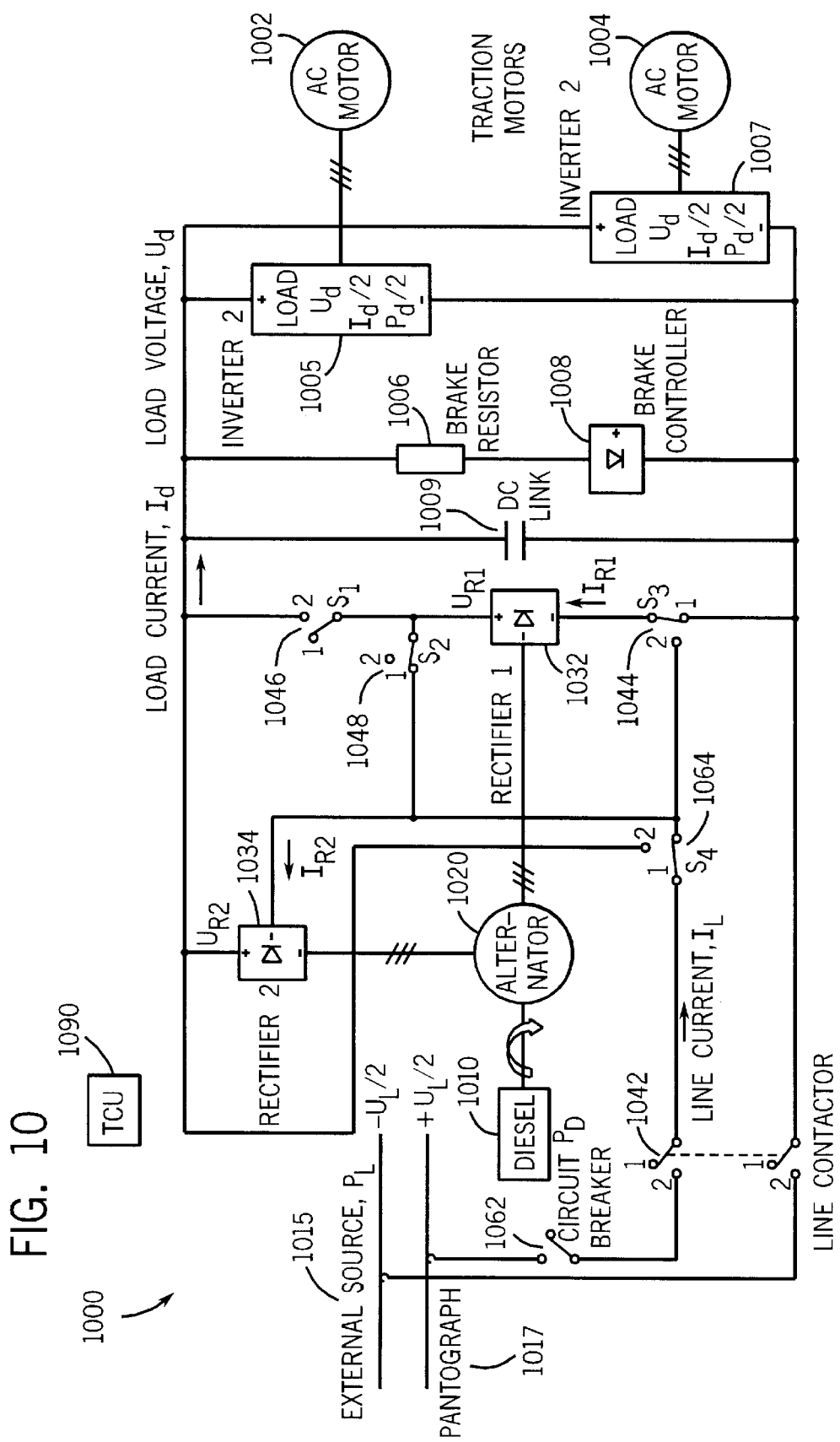
FIG. 10 is a schematic circuit diagram of a diesel powered AC haul truck with a dual mode or diesel boost or direct trolley configuration in accordance with an exemplary embodiment.

FIG. 10 illustrates an exemplary embodiment having two voltage source inverters (VSI) 1005 and 1007 forming the load and facilitating this smooth transition. Each VSI incorporates a capacitor bank 1009 as part of its input circuit, which forms the so-called DC link. Each VSI can be operated so that, within certain limits, its output voltage (which is connected to motors 1002 and 1004) can be adjusted independently of the DC link (input) voltage. A system controller 1090 adjusts the DC link voltage in accordance with the requirements of the connect or disconnect sequence by adjusting the alternator excitation and the inverters maintain continuous seamless power flowed to their respective motor.

Figure 5:
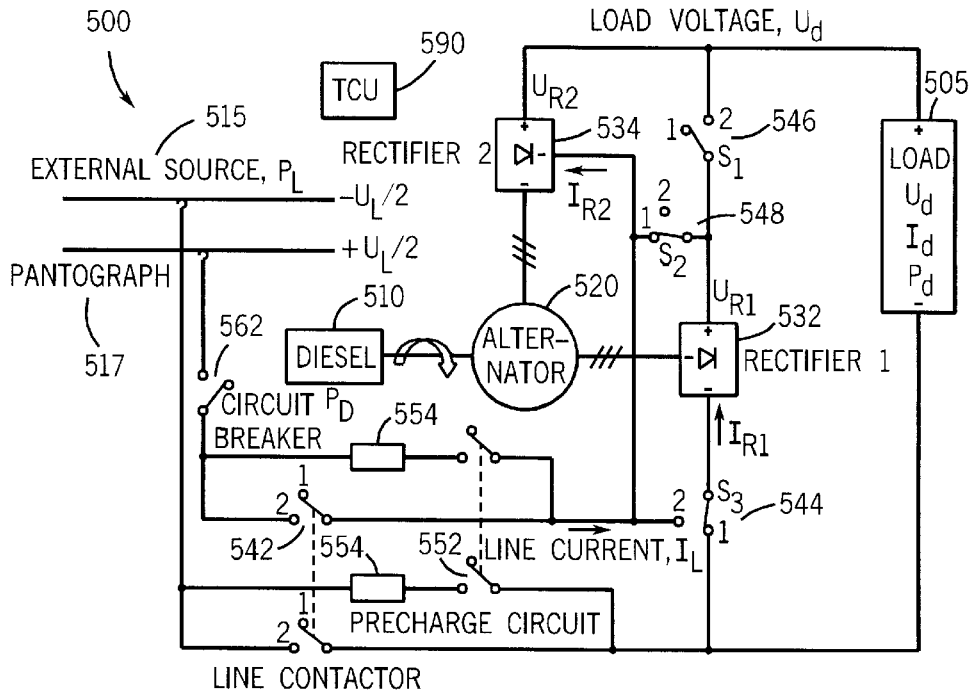
FIG. 5 is a schematic circuit diagram of a system capable of seamless full load power transfer in accordance with an exemplary embodiment.

Part 2—Use of an External (Low Voltage) Source to Commutate the Load During Connect and Disconnect Sequences A solution to the commutation problem is to make the transition in distinct steps using a circuit topology and control strategy as described below. FIG. 5 illustrates a system 500 where an external power source 515 is first connected in parallel with one of the dual rectifiers 532. This provides a commutation path for the load current so that the said rectifier can be disconnected and then reconnected in parallel with the other rectifier with no current flowing ($I_{R1}=0$). As such, alternator 520 and rectifiers 532 and 534 can be smoothly reconfigured from series to parallel operation, doubling their combined current rating, and halving their voltage rating, without interrupting the load current. Finally, the load current is increased to its limit with both sources ($P_D$, $P_L$) contributing power at their rated limits.

Figure 6:
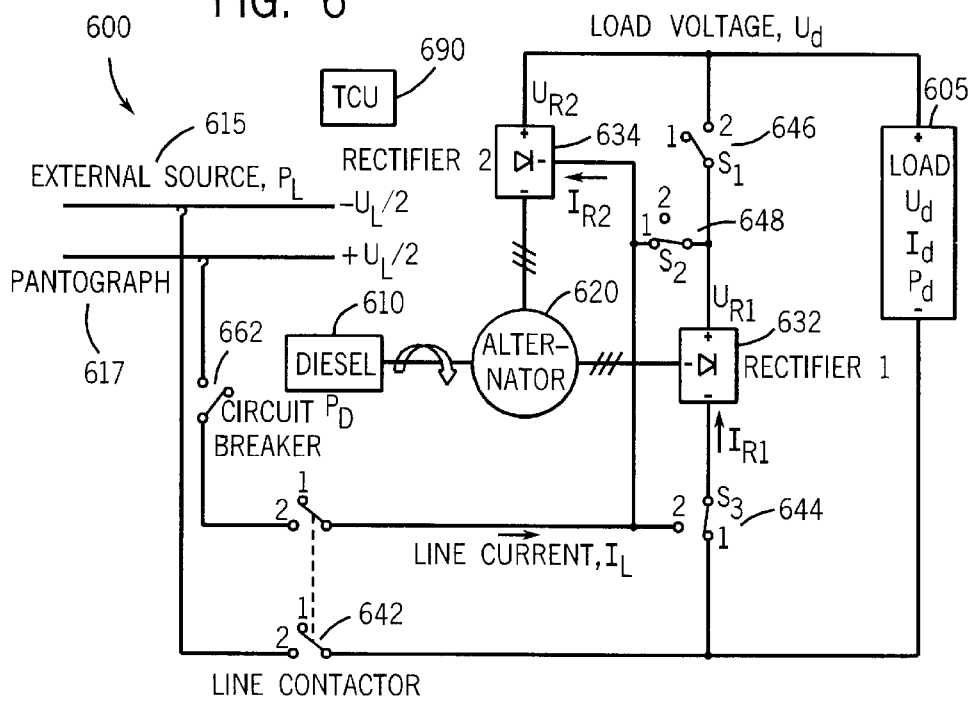
FIG. 6 is a schematic circuit diagram of a system optimized for fewer components in accordance with an exemplary embodiment.

Precharge circuit 550 illustrated in FIG. 5 controls the rate of power transfer from alternator 510 and rectifier 532 to external source 515. This simplifies the control problem and allows the system controller to maintain the rated load voltage during the transfer. The rating of precharge circuit 550 may be minimized because it only needs to accommodate the difference in voltage between the external source voltage and the output of Rectifier 532 at the beginning of the transfer. FIG. 6 illustrates a system 600 in which the precharge circuit can be eliminated by means of a proper control strategy implemented by the controller.

Diesel Boost Configuration and Control Strategy of the Present Invention

Referring now to FIG. 6, the single winding alternator and diode rectifier of FIG. 1 are replaced with a dual winding alternator 620 connected to two diode rectifiers 632 and 634. The two windings are identical and each supplies half the rated voltage of the alternator. A two-pole line contactor 642 brings the trolley voltage to where it can be connected in parallel with rectifier 632. A single pole, double-throw changeover switch ($S_3$) and two single-pole, single-throw switches ($S_1$ and $S_2$) 646 and 648 enable the outputs of rectifier 632 to be connected either in series or parallel with rectifier 634. An additional single pole high-speed circuit breaker 662 provides overcurrent protection between the truck and trolley systems.

With all the switches in position 1, rectifiers 632 and 634 are in series and there is no connection to the trolley line. The load operates at $U_D=U_{d,max}$, $I_D<I_{d,max}$ and $P_D<P_{d,max}$. With all the switches in position 2, rectifiers 632 and 634 are in parallel with each other and in series with the trolley line. The load operates at $U_D=U_{d,max}$, $I_L=I_{d,max}$ and $P_D+P_L=P_{d,max}$.

The truck operates in normal Diesel mode when the switches are in position 1 and all the power is provided by the diesel engine. Transition from Diesel to Diesel Boost operation functions according to the connection sequence described previously. During Diesel Boost operation, the switches are all in position 2. Transition from Diesel Boost to Diesel operation functions according to the disconnect sequence described previously.

Connect Sequence: Making the External Series Connection Under Load

Figure 8:
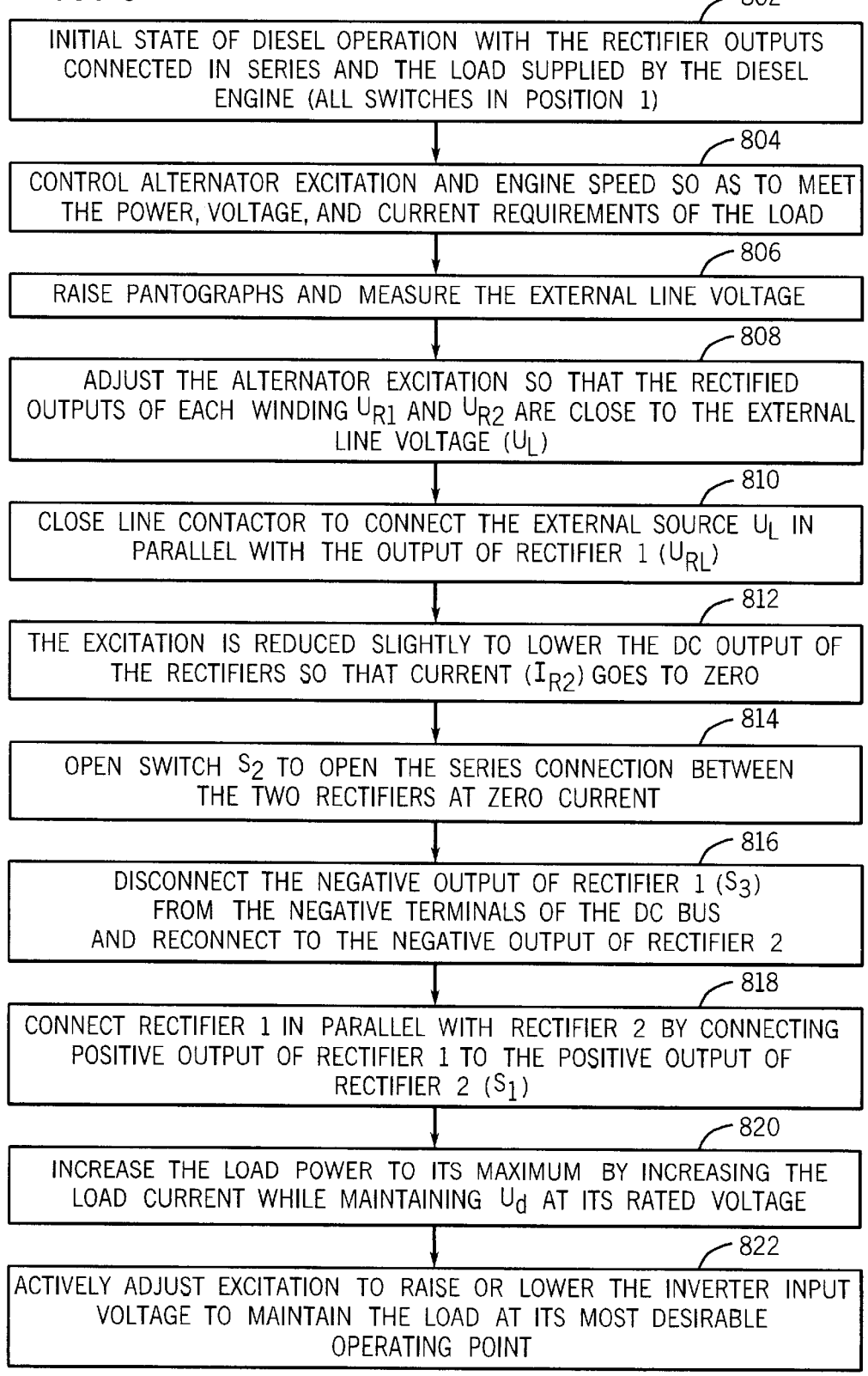
FIG. 8 is a flow chart for a connect sequence in accordance with an exemplary embodiment.

FIG. 8 illustrates a flow diagram of a commutation process to connect the external source in series and switch the rectifier outputs from series to parallel configuration. In an exemplary embodiment, the controller controls the operation.

The connection sequence of the exemplary embodiment begins with the rectifiers of the dual-windings of a source in a series configuration. The external source is placed in a parallel configuration with one of the rectifiers and the internal source gradually decreases in voltage until this rectifier is reverse biased and no longer supplying power to the load. The reversed biased rectifier carries no current and is then placed in parallel with the other rectifier, whereupon it begins carrying current so that twice the current is provided to the load as in the original configuration.

Step 802 begins from an initial state of diesel operation with the rectifier outputs connected in series and the load supplied by the diesel engine. In Step 804, during diesel operation, the alternator excitation and engine speed are controlled by the controller 490 (TCU, FIG. 4) so as to meet the power, voltage, and current requirements of the load. For diesel boost operation, the system controller (also referred to as the TCU or Traction Control Unit) controls the switching in FIGS. 4–6 on the basis of input signals such as the external line voltage and vehicle speed. The TCU controls an automated sequence to connect and disconnect the external power source while under full load.

The transition begins by raising the pantographs and measuring the external line voltage in Step 806 and adjusting the alternator excitation in Step 808 so that the rectified outputs of each winding are close to the external line voltage ($U_L$). The line contactor is then closed in Step 810 to connect the external source in parallel with the output of a first rectifier. No precharging is required before making the connection because the system controller maintains the rectifier output voltage to be close to the external line voltage ($U_L$) and no appreciable current flows through the line contactor.

Next, the excitation is reduced slightly in Step 812 to lower the DC output of the rectifiers and therefore lower the input voltage of the inverter's DC link. As a result, the external supply reverse biases the first rectifier and causes the portion of the load carried by the first rectifier to be transferred to the external supply. The load current is now supplied by the external source in series with a second rectifier. No current flows in the first rectifier. Opening switch $S_2$ in Step 814 now opens the series connection between the two rectifiers at zero current. Due to this arrangement, the load is maintained at all times at the voltage and current level corresponding to its rated power during diesel operation ($P_D$). The system is now operating in diesel boost mode, but the power level has not yet been raised from $P_D$ to $P_{d,max}$.

It will be appreciated that this circuit topology is able to advantageously connect the line without any precharge process and then open switch $S_2$ at zero current because the load is a voltage source inverter. The controller (TCU) for such an inverter is able to compensate, within certain limits, for variations in the input voltage connected to the inverter's DC link and maintain the load at full power. Therefore, in addition to its normal function of controlling the load inverter, the controller also independently adjusts the excitation to vary the inverter input voltage during the connection sequence to provide a smooth transition to series operation while under load. This provides a seamless series connection to the external source.

At this time, the series connection between the first rectifier and the second rectifier is open and has no effect on the operation because there is no current flowing in the first rectifier. The negative output of the first rectifier is then disconnected in Step 816 from the negative terminals of the DC bus and reconnected to the negative output of the second rectifier. Here again, no current flows in the first rectifier or either switch due to the circuit topology.

In Step 818, the first rectifier is connected in parallel with the second rectifier by connecting the positive output of the first rectifier to the positive output of the second rectifier. Since the alternator windings share a common flux path, half of the load current flowing in a first winding quickly and smoothly transfers to a second winding until both windings and rectifiers equally share the load, thereby completing the transfer.

The outputs of the two rectifiers are now connected in parallel with each other and in series with the external source. Each alternator winding operates at its full rated voltage but only half its rated current. The diesel operates at half its rated output ($0.5*P_D$) and the external supply provides the rest of the power ($0.5*P_L$). The load operates at its rated voltage and with current and power equivalent to what the diesel engine alone provides during Diesel Operation.

In a step 820, load power is increased to its maximum by increasing the load current. The current splits equally between the two rectifiers and alternator windings so they are not overloaded. The increased power comes partially from the diesel and partially from the external source. The transition from full diesel power ($P_D$) to maximum load power ($P_{d,max}=P_D+P_L$) occurs at the same voltage by doubling the current drawn from the line and through the alternator. This power increase is also a seamless transition in that load voltage remains constant and the controller simply adjusts the load to draw more current from the combined power sources. The system is now taking full advantage of diesel boost operation by utilizing the excess voltage rating of the series connected dual winding alternator/rectifier to double its current rating with a parallel connection.

After the rectifiers are connected in parallel, the controller adjusts the alternator excitation so as to maintain the load at the most optimum voltage. This voltage could be raised or lowered (in step 822), for example, in consideration of the vehicle's speed to maintain the load at its most desirable operating point. The controller can also compensate for variations in line voltage by adjusting the excitation and so maintain the load at its ideal operating point.

Disconnect Sequence: Removing the External Series Connection Under Load

Figure 9:
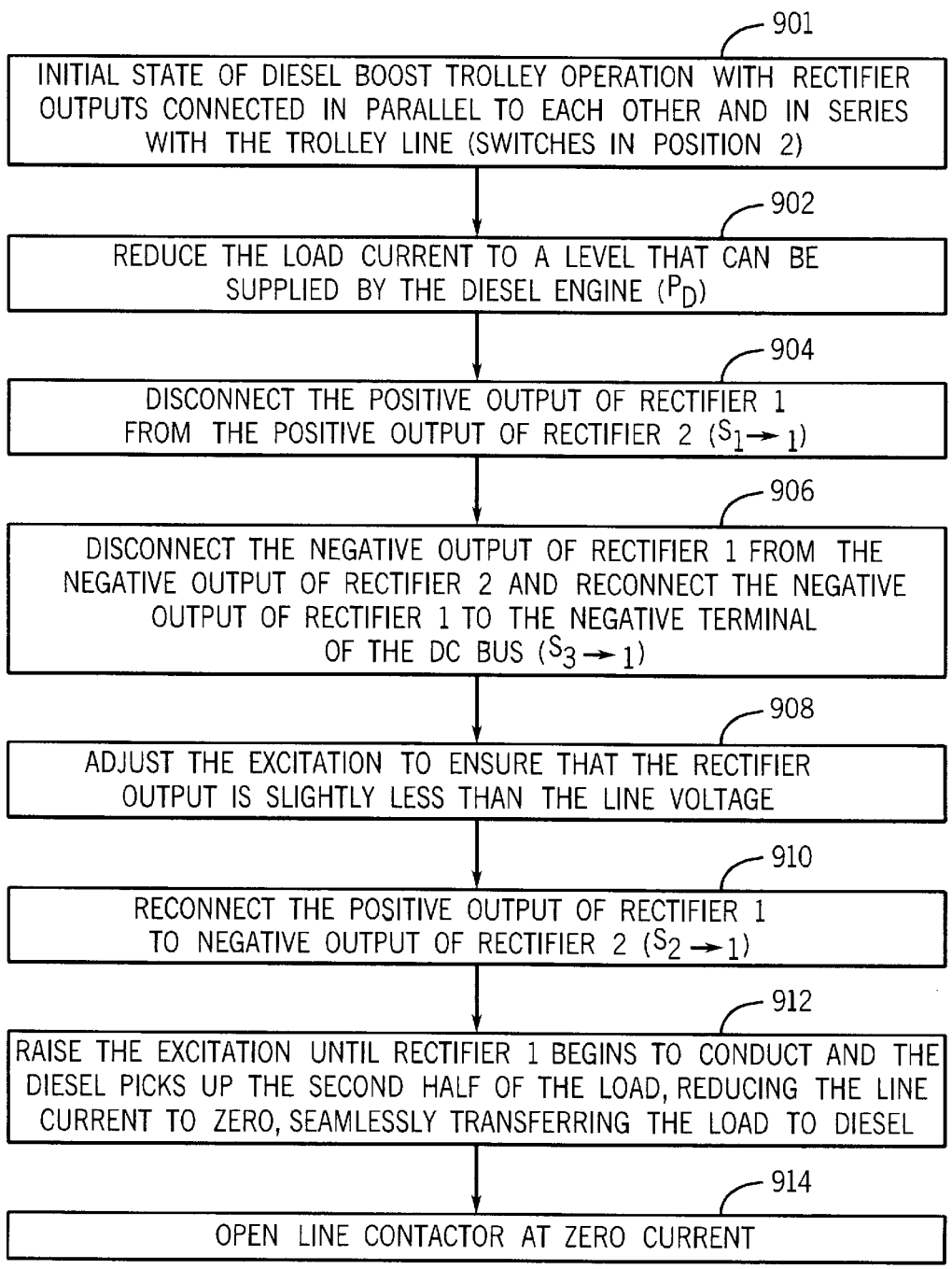
FIG. 9 is a flow chart for a disconnect sequence in accordance with an exemplary embodiment.

FIG. 9 illustrates a flow diagram of a commutation process to disconnect the external power source and restore the series connection of the two rectifier outputs for Diesel Operation. Diesel Boost Trolley operation begins in Step 901 with rectifier outputs connected in parallel to each other and in series with the trolley line.

In Step 902, a controller seamlessly reduces the load current to a level that can be supplied by the diesel engine ($P_D$). In Step 904, the positive output of the first rectifier is disconnected from the positive output of the second rectifier. This removes the parallel rectifier connection and the load current smoothly transfers completely to the remaining winding. The engine, alternator and rectifier still provide half the load power, but one half of the alternator and one rectifier are at full current and voltage and the other half of the alternator and the other rectifier have no current. The other half of the load voltage is still supplied in this instance by the line. In Step 906, the negative output of the first rectifier is disconnected from the negative output of the second rectifier and the negative output of the first rectifier is reconnected to the negative terminal of the DC bus.

In preparation for restoring the serial connection between the two rectifier outputs, the controller in Step 908 adjusts the excitation to ensure that the rectifier output is slightly less than the line voltage. The positive output of the first rectifier is then reconnected in Step 910 to the negative output of the second rectifier. No current flows during or after this transition because the line voltage reverse biases the first rectifier. The controller in Step 912 then raises the excitation until the first rectifier begins to conduct and the diesel picks up the second half of the load, reducing the line current to zero, seamlessly transferring the load to the diesel. The line contactor is now opened at zero current in Step 914. This leaves the system back in Diesel Operation with (diesel) rated current and voltage at the load.

The exemplary embodiments described with reference to the FIGURES advantageously allow a high-current, high-voltage load to be supplied with supplemental power from an existing high-current, low-voltage source. Further, the exemplary embodiments allow the load to operate at power levels beyond what available diesel engines can provide. In addition, the exemplary embodiment minimizes the size of the alternator by permitting parallel connection of the windings (through the rectifiers) to effectively double its rated current when only half its rated voltage is required. The exemplary embodiments provide a smooth and bumpless transfer, allowing the load to operate at maximum diesel power throughout the transition seamlessly and without appreciably dropping the flow of power to the load or raising the voltage of the load while operating within the rating constraints of the first and second sources $P_D$, $P_L$ such that the power transfer is transparent to the load. That is no anomalies in power (current or voltage interruptions, spikes, oscillations, drop-off, perturbations, etc.) are sensed by the load.

In the exemplary embodiment, the two switches used to reconfigure the system for Diesel Boost Trolley Operation are single pole (not three phase) and are not required to make or break large currents or voltages. They generally operate (or change position) at zero current.

An exemplary embodiment is described as a particular example. However, it shall be clear that the invention is not limited to such example and may, in addition, be practiced otherwise. The following notations will be used in the following example.

| Notation: | Subscripts: |
|---|---|
| U = Voltage | L = Line (L = Trolley Line) |
| I = Current | D = Diesel |
| P = Power | d = Load Value (d = DC) |

-continued

| Notation: | Subscripts: |
|---|---|
| | R = Rectifier |
| | max = Maximum load power |

FIG. 10 illustrates a diesel powered off-highway haul truck system 1000 driven by two AC electric traction motors 1002 and 1004 supplied by two inverters 1005 and 1007 in accordance with the circuit topology shown in system 400 described with reference to FIG. 4. Inverters 1005 and 1007 are capable of handling a combined power $P_D$ at DC input voltage $U_D$ and DC input current $I_D$. Inverters 1005 and 1007 are connected to a common DC bus 1009 and are fed by an alternator 1020 and rectifier bridge at the rated inverter input voltage $U_D$. At this voltage level alternator 1020 and rectifier can supply current $I_D$ where $I_D$ is only approximately half of $I_D$. Alternator 1020 is driven by a diesel engine capable of delivering maximum power $P_D$, where $P_D$ is approximately half of the maximum load power $P_{d,max}$.

While travelling up a grade, it is desired to ascend the grade at a faster rate. To that end, the vehicle is connected to a low voltage trolley line with voltage $U_L$ by means of a pantograph 1017, thereby increasing the DC current supplied to inverters 1005 and 1007 from $I_D$ to $I_L$. This is done under the environment of maintaining the inverters at their rated DC input voltage $U_D$. This provides approximately twice the power to the load and thereby doubles the vehicle speed while on grade when connected to the low voltage trolley line.

The Parallel Line Connection of the trolley line with the DC bus is not possible since the voltage required by the inverters $U_d$ is almost twice the available trolley voltage $U_L$. A Series Line Connection to the trolley line is not possible since the available trolley current $I_L$ is twice the rated DC current of the alternator and rectifier $I_D$ and they will rapidly overheat.

The truck is able to drive from the loading shovel to the trolley line under diesel power $P_D$ and can go up the grade at this power level. To utilize the additional power available from the trolley, it is desirable for the truck to be able to connect to the trolley line while maintaining continuous operation on the grade at power $P_D$. If the power level falls during the transition, the truck will slow down and productivity will be reduced.

Prior to this invention, it has not been possible for high voltage inverters to make full use of the available low voltage trolley power. Using the circuit topology and control strategy described in the FIGURES, it is now possible to operate the truck on a low voltage trolley in Diesel Boost Mode at the full rated load power $P_{d,max}$.

FIG. 11 illustrates a table of operating conditions for diesel only, diesel boost trolley, and diesel trolley modes. The table includes switch configurations corresponding to the operating modes.

Of particular importance is that the duration of the actual transfer from one mode to the other is not critical because the transfer takes place with the vehicle operating under full diesel power. As such, it can maintain a normal operating speed. With no precharge interval, the limiting factor in the transition is the time required to raise and lower the pantograph.

The transition from diesel to trolley is bumpless and the vehicle will not slow down at all during the transfer. While on trolley, the diesel power ($P_D$) is supplemented by power from the wayside substations ($P_L$) and the inverters are able to operate at their full power. Depending on the exact voltage, current and power levels involved, this approximately doubles the vehicle's on-grade speed. The transition back from trolley to diesel is also quick and smooth. Hence, the exemplary embodiments resolve the previous problems seamlessly and without appreciably dropping the flow of power to the load or raising the voltage of the load while operating within the rating constraints of the first and second sources $P_D$, $P_L$ such that the power transfer is transparent to the load.

Alternative Examples of the Invention

Figure 2:
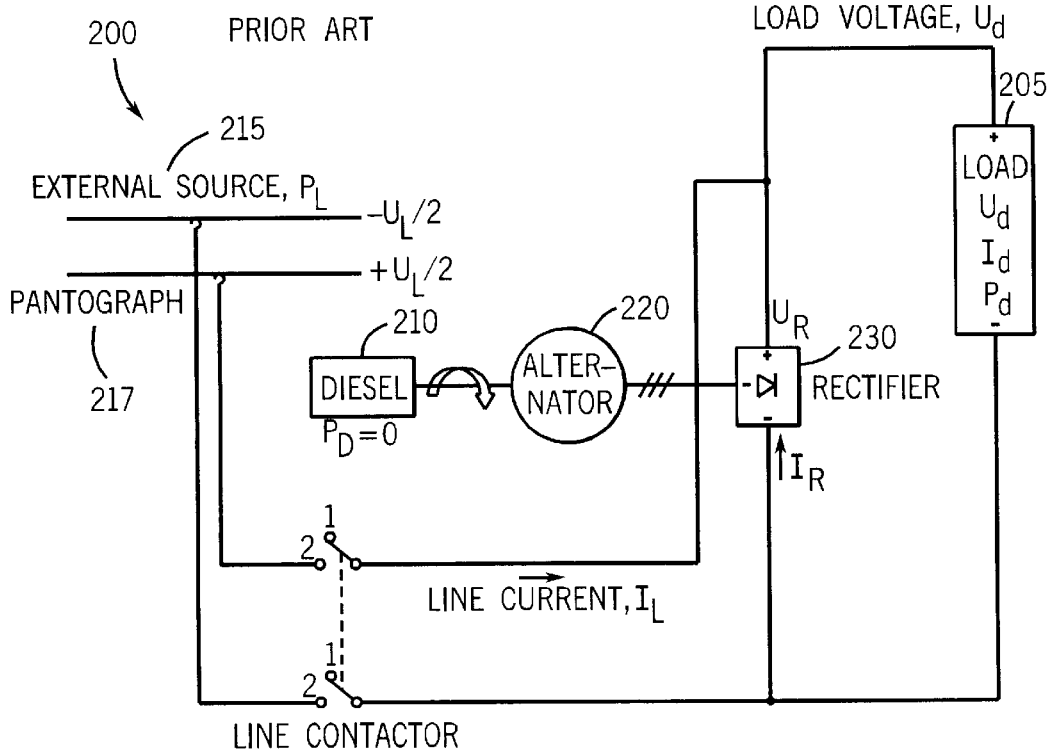
FIG. 2 is a schematic circuit diagram illustrating a parallel line connection in accordance with a conventional system.

In mines where the trolley voltage is suitably high ($U_L = U_d$) the truck can operate in Direct Trolley mode. This uses the Parallel Line Connection described with reference to system 200 described with reference to FIG. 2 and does not require switches $S_1$, $S_2$, or $S_3$, only the circuit breaker and line contactor.

Figure 7:
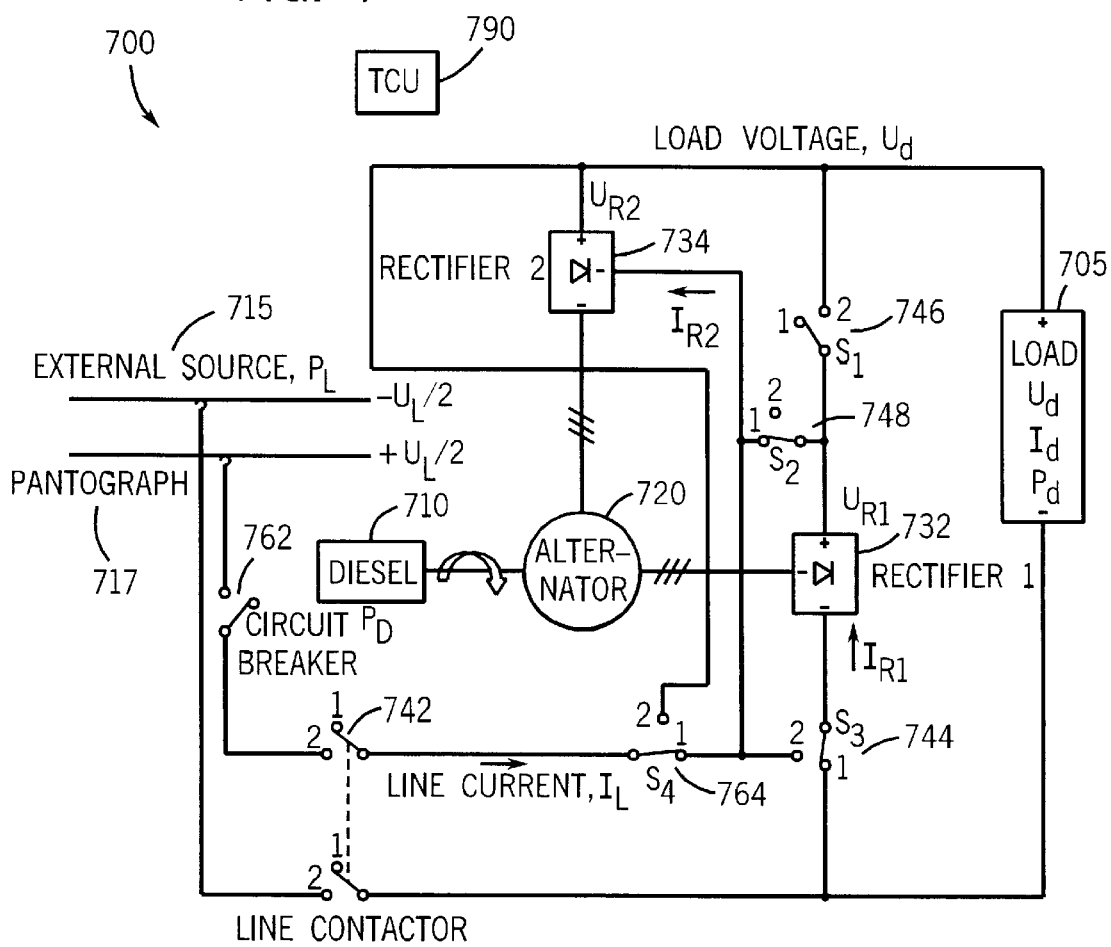
FIG. 7 is a schematic circuit diagram of a dual mode configuration in accordance with an exemplary embodiment.

There are, however, some situations where both high and low voltage trolley systems are installed, or could be installed, in the same mine. In this case, it would be desirable to operate the truck on either line using either the low voltage line in Diesel Boost Trolley mode or the high voltage line in Direct Trolley mode. A variation of the invention, as shown in FIG. 7, is the addition of a second single-pole, double-throw switch ($S_4$) 764 to allow the truck to operate on both high and low voltage trolley systems. This dual mode operation is also incorporated in the exemplary embodiment of FIG. 10.

The switch's common terminal in this case is connected to the load side of the positive pole of the line contactor. The other terminals are connected to the positive and negative sides of rectifier 734, such that in position 1, the line contactor is connected to the negative terminal of rectifier 734 and in position 2 the line contactor is connected to the positive terminal of rectifier 734. With $S_4$ in position 1, the truck can operate in either Diesel or Diesel Boost mode by moving the other switches ($S_1$, $S_2$, $S_3$) to position 1 or position 2, as previously described. This is suitable for operation under diesel power or on the low voltage trolley system, when $U_L < U_D$. With $S_4$ in position 2, and all other switches in position 1, the truck can operate in Direct Trolley mode as described above. This is suitable for operation on the high voltage trolley system, where $U_L = U_D$, or $U_L$ is within the operating range of the load. In operation, the operator drives the vehicle under either trolley system and then raises the pantograph. The system controller measures the trolley line voltage and positions $S_4$ accordingly. If $U_L = U_D$ then load power is increased and Direct Trolley operation begins. If $U_L < U_D$, then the connect sequence with $S_1$, $S_2$, and $S_3$ is carried out, the load power is increased and Diesel Boost Trolley operation begins. This provides safe, automatic, and reliable operation on either trolley system without any consideration from the driver as to the operating voltage of the trolley line.

What is claimed is:

1. A system that seamlessly places an additional power source ($P_1$) in series with a first source ($P_D$) while said source $P_D$ supplies a load with power when additional power is required by said load, said system comprising:

a first source ($P_D$) for supplying said load with power;

a second source ($P_1$) for supplying said load with additional power; and a controller that electrically couples said second source seamlessly in series with said first source ($P_D$) such that, while said first source ($P_D$) supplies power to said load said second source ($P_L$) is seamlessly placed in series with said first source ($P_D$) to significantly increase power to said load, wherein said first source ($P_D$) is coupled to at least two series-connected circuit elements that each supply a portion of said power to said load; wherein said controller couples said second source ($P_L$) in parallel with at least one of said circuit elements and then uncouples at least one of said circuit elements from said second source ($P_L$) thereby seamlessly placing the at least one of said circuit elements of the at least two series-connected circuit elements of said first source in series with said second source ($P_L$).

2. A system that seamlessly places an additional power source ($P_L$) in series with a first source ($P_D$) while said source $P_D$ supplies a load with power when additional power is required by said load, said system comprising:

a first source ($P_D$) for supplying said load with power;

a second source ($P_L$) for supplying said load with additional power; and a controller that electrically couples said second source seamlessly in series with said first source ($P_D$) such that, while said first source ($P_D$) supplies power to said load, said second source ($P_L$) is seamlessly placed in series with said first source ($P_D$) to significantly increase power to said load.

wherein said controller switches between an internal series configuration of said circuit elements of said first source which provides power from said first source to the load and a parallel configuration of said circuit elements which provides power from said first source to the load in conjunction with said second source, wherein said series configuration configures a circuit element that channels power from said first source to said load in series with a shared circuit element, which is shared between said first source and said second source, that channels power from said first source to said load, and wherein said parallel configuration configures said circuit element in parallel with said shared element, which channels power from said first source in conjunction with said second source to said load.

3. A system that seamlessly places an additional power source ($P_L$) in series with a first source ($P_D$) while said source $P_D$ supplies a load with power when additional power is required by said load, said system comprising:

a first source ($P_D$) for supplying said load with power;

a second source ($P_L$) for supplying said load with additional power; and a controller that electrically couples said second source seamlessly in series with said first source ($P_D$) such that, while said first source ($P_D$) supplies power to said load, said second source ($P_L$) is seamlessly placed in series with said first source ($P_D$) to significantly increase power to said load, wherein said controller switches between an internal series configuration of said circuit elements of said first source which provides power from said first source to the load and a parallel configuration of said circuit elements which provides power from said first source to the load in conjunction with said second source, wherein said series configuration configures a circuit element that channels power from said first source to said load in series with a shared circuit element, which is shared between said first source and said second source, that channels power from said first source to said load, and wherein said parallel configuration configures said circuit element in parallel with said shared element, which channels power from said first source in conjunction with said second source to said load, wherein said shared circuit element is a first rectifier and said circuit element is a second rectifier.

4. A system that seamlessly places an additional power source ($P_L$) in series with a first source ($P_D$) while said source $P_D$ supplies a load with power when additional power is required by said load, said system comprising:

a first source ($P_D$) for supplying said load with power;

a second source ($P_L$) for supplying said load with additional power; and a controller that electrically couples said second source seamlessly in series with said first source ($P_D$) such that, while said first source ($P_D$) supplies power to said load, said second source ($P_L$) is seamlessly placed in series with said first source ($P_D$) to significantly increase power to said load, wherein said controller switches between an internal series configuration of said circuit elements of said first source which provides power from said first source to the load and a parallel configuration of said circuit elements which provides power from said first source to the load in conjunction with said second source, wherein said series configuration configures a circuit element that channels power from said first source to said load in series with a shared circuit element, which is shared between said first source and said second source, that channels power from said first source to said load, and wherein said parallel configuration configures said circuit element in parallel with said shared element, which channels power from said first source in conjunction with said second source to said load, wherein said shared circuit element is a first rectifier and said circuit element is a second rectifier, and wherein said first source is a dual-winding source, and wherein said first rectifier is coupled to a first winding of said first source and said second rectifier is coupled to a second winding of said first source.

5. A system that seamlessly places an additional power source ($P_L$) in series with a first source ($P_D$) while said source $P_D$ supplies a load with power when additional power is required by said load, said system comprising:

a first source ($P_D$) for supplying said load with power;

a second source ($P_L$) for supplying said load with additional power; and a controller that electrically couples said second source seamlessly in series with said first source ($P_D$) such that, while said first source ($P_D$) supplies power to said load, said second source $P_L$) is seamlessly placed in series with said first source ($P_D$) to significantly increase power to said load, wherein said controller switches between an internal series configuration of said circuit elements of said first source which provides power from said first source to the load and a parallel configuration of said circuit elements which provides power from said first source to the load in conjunction with said second source, wherein said series configuration configures a circuit element that channels power from said first source to said load in series with a shared circuit element, which is shared between said first source and said second source, that channels power from said first source to said load, and wherein said parallel configuration configures said circuit element in parallel with said shared element, which channels power from said first source in conjunction with said second source to said load, wherein said shared circuit element is a first rectifier and said circuit element is a second rectifier, further comprising a switch that selectively uncouples a positive output terminal of said first rectifier from a negative output terminal of said second rectifier, thereby breaking the series connection of said circuit elements of said first source.

6. A system that seamlessly places an additional power source ($P_L$) in series with a first source ($P_D$) while said source $P_D$ supplies a load with power when additional power is required by said load, said system comprising:

a first source ($P_D$) for supplying said load with power;

a second source ($P_L$) for supplying said load with additional power; and a controller that electrically couples said second source seamlessly in series with said first source ($P_D$) such that, while said first source ($P_D$) supplies power to said load, said second source ($P_L$) is seamlessly placed in series with said first source ($P_D$) to significantly increase power to said load, wherein said controller switches between an internal series configuration of said circuit elements of said first source which provides power from said first source to the load and a parallel configuration of said circuit elements which provides power from said first source to the load in conjunction with said second source, wherein said series configuration configures a circuit element that channels power from said first source to said load in series with a shared circuit element, which is shared between said first source and said second source, that channels power from said first source to said load, and wherein said parallel configuration configures said circuit element in parallel with said shared element, which channels power from said first source in conjunction with said second source to said load, wherein said shared circuit element is a first rectifier and said circuit element is a second rectifier, further comprising a switch that selectively uncouples a positive output terminal of said first rectifier from a negative output terminal of said second rectifier, thereby breaking the series connection of said circuit elements of said first source, further comprising a second switch for selectively uncoupling a negative output terminal of said first rectifier from the negative input terminal of load and coupling said negative output terminal to a negative output terminal of a said remaining circuit element of said first source, thereby preparing for configuring said first rectifier in said parallel configuration.

7. A system that seamlessly places an additional power source ($P_L$) in series with a first source ($P_D$) while said source $P_D$ supplies a load with power when additional power is required by said load, said system comprising:

a first source ($P_D$) for supplying said load with power;

a second source ($P_L$) for supplying said load with additional power; and a controller that electrically couples said second source seamlessly in series with said first source ($P_D$) such that, while said first source ($P_D$) supplies power to said load, said second source ($P_L$) is seamlessly placed in series with said first source ($P_D$) to significantly increase power to said load, wherein said controller switches between an internal series configuration of said circuit elements of said first source which provides power from said first source to the load and a parallel configuration of said circuit elements which provides power from said first source to the load in conjunction with said second source, wherein said series configuration configures a circuit element that channels power from said first source to said load in series with a shared circuit element, which is shared between said first source and said second source, that channels power from said first source to said load, and wherein said parallel configuration configures said circuit element in parallel with said shared element, which channels power from said first source in conjunction with said second source to said load, wherein said shared circuit element is a first rectifier and said circuit element is a second rectifier, further comprising a switch that selectively uncouples a positive output terminal of said first rectifier from a negative output terminal of said second rectifier, thereby breaking the series connection of said circuit elements of said first source, further comprising a second switch for selectively uncoupling a negative output terminal of said first rectifier from the negative input terminal of load and coupling said negative output terminal to a negative output terminal of a said remaining circuit element of said first source, thereby preparing for configuring said first rectifier in said parallel configuration, further comprising a third switch for selectively coupling said positive output terminal of said first rectifier to a positive output terminal of said second rectifier, thereby configuring said first rectifier in said parallel configuration.

8. A method of providing additional power to a load, where the load is connected to a first rectifier and a second rectifier, the first and second rectifiers being coupled to an engine by an alternator, the method comprising:

adjusting excitation of the alternator such that outputs of the first and second rectifiers approximate an external line voltage ($U_L$) of an external source ($P_L$);

connecting the external source ($P_L$) in parallel with an output of the first rectifier;

opening a series connection between the first and second rectifiers;

disconnecting a negative output of the first rectifier and connecting the negative output of the first rectifier to a negative output of the second rectifier;

connecting the first rectifier in parallel with the second rectifier by connecting a positive output of the first rectifier to a positive output of the second rectifier; and increasing power to the load by increasing the load current.

9. The method of claim 8, wherein increasing power to the load by increasing the load current includes receiving additional power from the external source ($P_L$).

10. The method of claim 8, wherein opening a series connection between the first and second rectifiers includes opening a switch.

11. The method of claim 8, further comprising measuring the external line voltage ($U_L$).

12. The method of claim 8, wherein connecting the external source ($P_L$) in parallel with an output of the first rectifier includes closing a line contactor.

13. The method of claim 8, wherein increasing power to the load by increasing the load current includes sharing current between the first and second rectifiers.

14. A system in which a low-voltage, high-current DC power source ($P_L$) is connected in series with a high-voltage, low-current DC power source ($P_D$) when additional power is required by a load, the system comprising:

a diesel mode in which first and second rectifiers coupling an alternator, to provide the high-voltage, low-current DC power source ($P_D$), are connected in series to supply a diesel rated current and rated voltage to the load; and a diesel boost mode in which the first and second rectifiers are connected in parallel to supply twice the diesel rated current at half the rated voltage, wherein the low-voltage, high-current DC power source ($P_L$) is connected in parallel with the first rectifier of the two rectifiers in the diesel mode such that the first rectifier can be disconnected and reconnected with the second rectifier of the two rectifiers in the diesel boost mode, wherein power to the load can be increased to maximum rated load current after the system seamlessly moves from diesel mode to diesel boost mode.

15. The system of claim 14, further comprising means for connecting rectifier circuits in series.

16. The system of claim 15, further comprising means for measuring an external line voltage and adjusting alternator excitation such that rectified outputs of alternator windings are close to the external line voltage.

17. The system of claim 16, further comprising means for closing a line contactor to connect an external power source ($P_L$) in parallel with an output of a first rectifier.

18. The system of claim 17, further comprising means for reducing the alternator excitation to lower the outputs of the rectifiers.

19. The system of claim 17, further comprising means for opening a switch to open a series connection between the rectifiers at zero current.

20. The system of claim 19, further comprising means for disconnecting a negative output of the first rectifier and connecting a positive output of the first rectifier to the positive output of the second rectifier.

* * * * *